United States Patent [19]

Strong

[11] Patent Number: 4,722,301
[45] Date of Patent: Feb. 2, 1988

[54] BROODER FEEDING APPARATUS

[76] Inventor: George W. Strong, Rt. 3, Box 1330, Center, Tex. 75935

[21] Appl. No.: 861,141

[22] Filed: May 8, 1986

[51] Int. Cl.$^4$ .............................................. A01K 5/02
[52] U.S. Cl. ............................. 119/52 AF; 119/51.11
[58] Field of Search .................. 119/51 R, 52 AF, 53, 119/51.11, 18, 56 R

[56] References Cited

U.S. PATENT DOCUMENTS

| | | | |
|---|---|---|---|
| 2,738,765 | 3/1956 | Hart | 119/52 AF |
| 3,033,163 | 5/1962 | Hostetler et al. | 119/52 AF |
| 3,415,228 | 12/1968 | Meyers | 119/51.11 |
| 3,561,403 | 2/1971 | Wilson | 119/51.11 |
| 3,585,970 | 6/1971 | Scott | 119/53 |
| 3,598,087 | 8/1971 | Ramser | 119/51.11 |
| 4,337,728 | 7/1982 | Van Gilst et al. | 119/52 AF X |
| 4,446,818 | 5/1984 | Rigterink | 119/52 AF |

Primary Examiner—William F. Pate, III
Assistant Examiner—Creighton Smith
Attorney, Agent, or Firm—John M. Harrison

[57] ABSTRACT

An improved brooder feeding apparatus for a poultry house which includes at least one feed distribution apparatus suspended in a designated brooder area inside the poultry house for locating feed along the entire length of the brooder area, with specially designed drop tubes in the feed distribution apparatus and brooder feed pans located beneath the drop tubes for distributing feed through the drop tubes into the pans and feeding brooder poultry such as baby chicks. The feed distribution apparatus is further characterized by an elongated, hollow tube, channel or trough provided with an auger and a feed hopper located at one end of the tube or trough for moving feed from the feed hopper through the elongated tube or trough and the drop tubes to a feed flow control box located at the opposite end of the feed tube. Feed distribution through the brooder feeding apparatus is controlled by adjusting the height of the drop tubes with respect to the pans and by means of a timer provided in connection with a drive motor which powers the auger.

12 Claims, 7 Drawing Figures

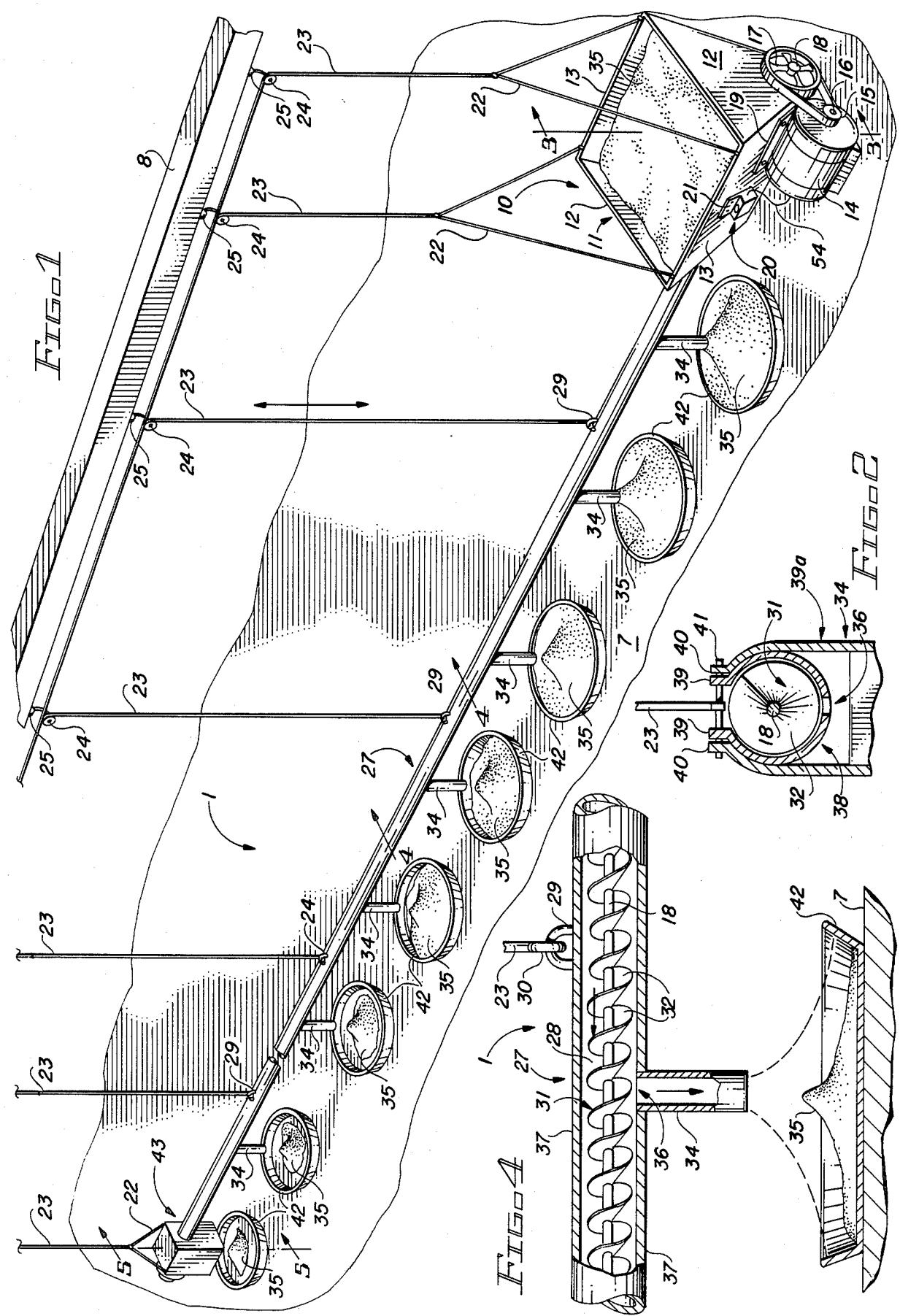

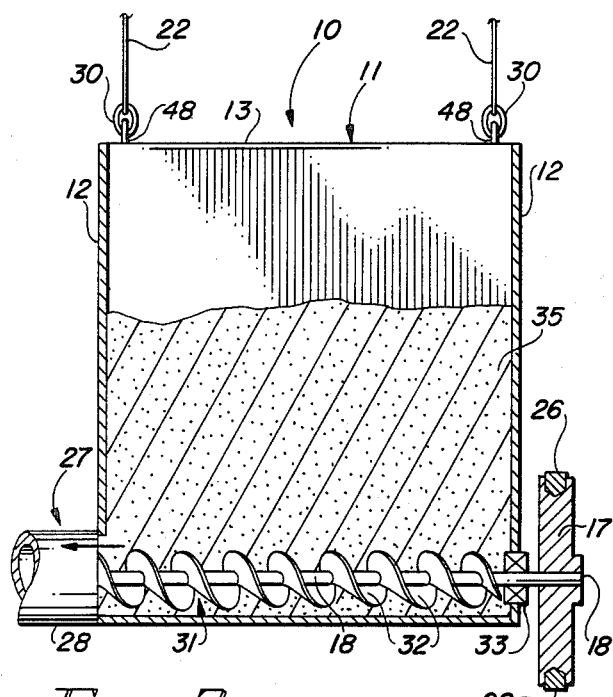
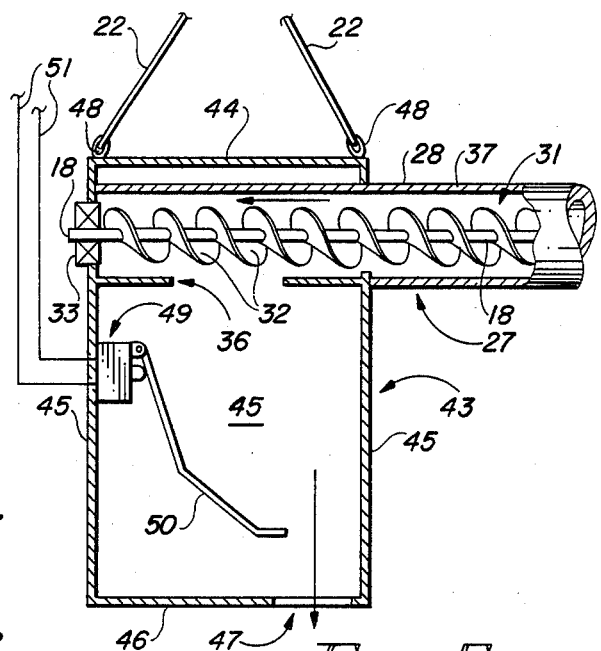
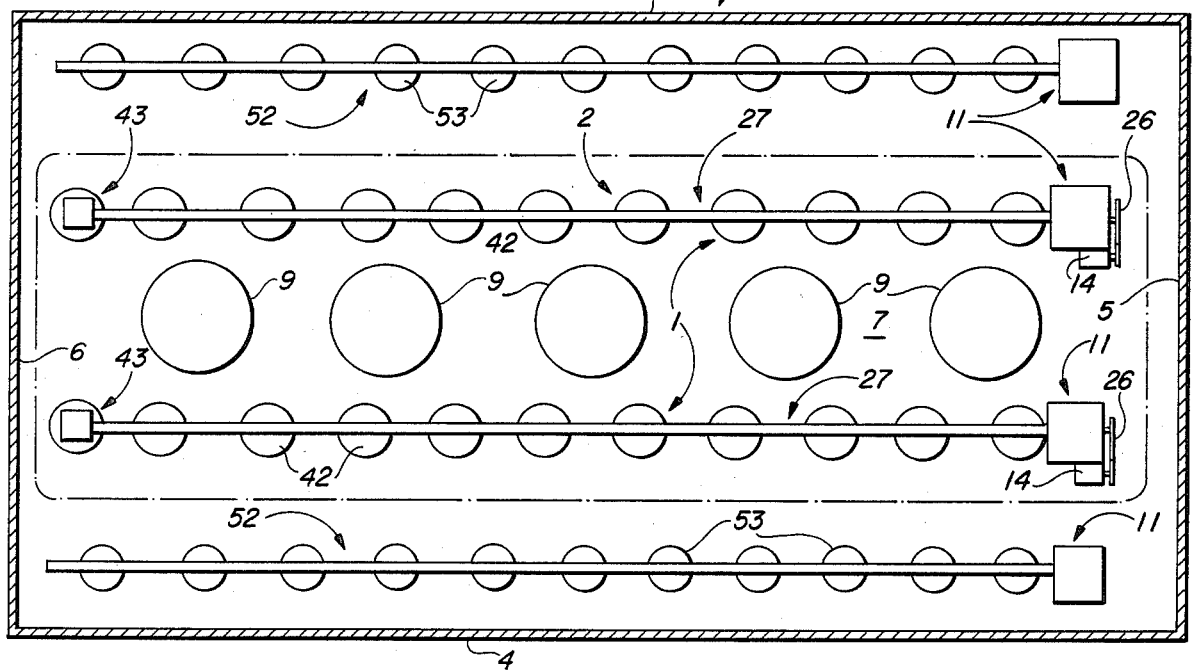
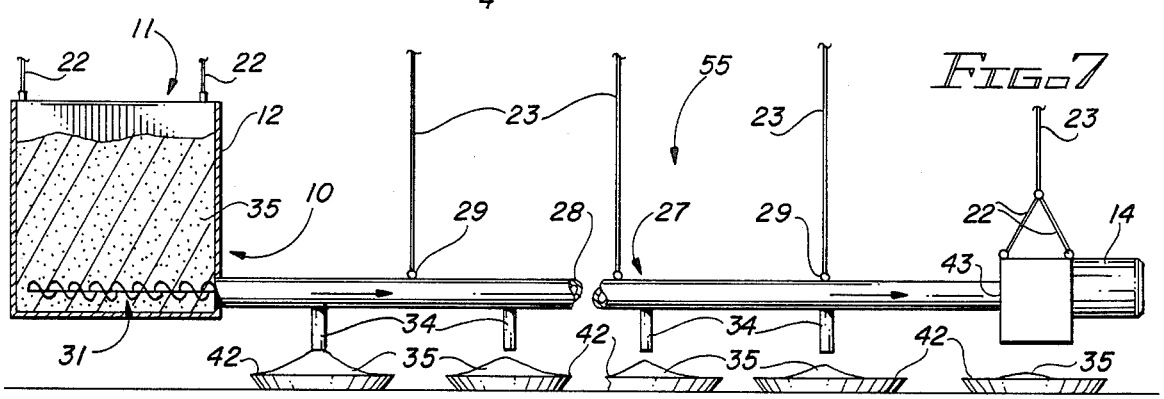

BROODER FEEDING APPARATUS

BACKGROUND OF THE INVENTION

1. Field of the Invention

This invention relates to brooder houses and feeding apparatus for raising poultry and more particularly, to an improved brooder feeding apparatus which is characterized by an elongated tube or trough provided with an internal auger, a feed hopper provided at one end of the tube or trough and a control box located at the opposite end thereof, with spaced drop tubes extending downwardly from the tube or trough and brooder pans located beneath the drop tubes. Feed is carried by the auger from the feed hopper through the tube or trough and is delivered into the drop tubes and brooder feed pans through openings located in the tube or trough. The drop tubes are sequentially provided with feed to fill the respective brooder feed pans beginning with the brooder feed pan closest to the feed hopper and the control box operates by means of a microswitch to terminate operation of the auger and distribution of the feed through the drop tubes when the feed fills the last brooder feed pan. In a preferred embodiment of the invention the entire brooder feeding apparatus is capable of being raised and lowered by means of supporting cables to adjust the volume of feed delivered to the brooder feed pans and to facilitate removal of the apparatus from the proximity of the brooder floor in the poultry house after approximately 2 to 3 weeks. Larger, conventional feeders located outside the brooding area are then used to feed the chicks to a market age of about 6½ weeks.

Poultry such as broilers are typically grown in a structure approximately 38'×350' long. The poultry house is commonly divided transversely in half by a curtain which extends from the ceiling to the floor, thus making it possible to heat and cool one-half of the structure at a time. This heated area of the poultry house is the area where poultry such as small chickens ("chicks") are kept from birth to approximately 2 to 3 weeks of age, depending upon the outside temperature and prevailing weather. This area is called the brooder area of the chicken house and the chicks must reach several days of age before they will venture out from the brooder area to eat. Accordingly, feeder trays having a diameter of approximately 24 inches and one inch in height are typically placed close to heated brooders in the brooder area in order to insure that the hatched chicks eat, drink and stay warm until they are about seven days old. At this time, the chicks will begin to venture out of the brooder area and attempt to eat from the larger outside feeder pans. However, these outside feeder pans are typically three inches high and are designed for larger birds, so that many of the chicks starve from lack of feed, if no other source of food is provided during the first few days. The small brooder chicks must be fed in the brooder feed pans by hand at least twice daily during the first critical seven day period of time. Each chick eats approximately six tenths of a pound of feed by the time it is two weeks of age; accordingly, approximately five thousand pounds of feed should be dispensed by hand in the brooder area of a conventional poultry house over a two week period of time. The chicks will also consume about 3700 pounds of feed from the existing larger mechanical feeders by the time they reach two weeks of age. The existing mechanical feeders are primarily designed to feed only the larger chickens after 2 to 3 weeks of age. The brooder feeding apparatus of this invention delivers feed to the young chicks automatically, at least twice daily, in 5 to 12 minutes of total feed-distribution time, saving extensive hand labor. Most poultry farmers own two to four poultry houses, each with a capacity of about 14,000 chickens. Accordingly, about 10,000-20,000 pounds of feed should be placed in the brooder feed pans by hand during the entire brooding period, while feeding of the larger chickens is accomplished by automatic mechanical feeders.

DESCRIPTION OF THE PRIOR ART

Typical automatic feeding devices used in poultry houses consist of a feed hopper and power unit combination which delivers feed by operation of a ribbon of "flex" auger positioned inside a tube or a rounded trough. This auger and tube or trough combination extends from inside a feed hopper located at one end of the poultry house to the other end of the structure. The feeder delivers feed to pans of about 3 inches in height which are connected to the primary delivery tube at spaced intervals, in order to receive the feed. The number of pans varies according to the number of chickens to be fed. A small opening at the point of attachment of each pan to the tube or trough allows feed to fall sequentially into the pans with the filling of the pans proceeding sequentially according to the distance between the respective pans and the feed hopper. The feed is automatically supplied to the hopper by an overhead auger and the existing mechanical feeders are designed to accommodate larger poultry and are located outside the brooding area of the poultry house. In each feeder the end pan is provided with an enclosure which is fitted with a control tube having a microswitch. The microswitch is designed to interrupt the flow of electric current and stop and auger when feed which is delivered through the entire length of the tube or trough drops into the control tube and fills the last pan located beneath the control tube.

A critical problem in the feeding of baby chicks and particularly, those chicks which are brooded in large poultry houses, is that of supplying feed and water to the chicks during a time period immediately after the chicks are hatched until about seven days from the hatch time. Since the chicks will not initially venture from the brooder area by nature, they must be fed by hand from small trays or feed troughs in the brooding area which have a very short lip or edge to facilitate easy access to the feed. As above noted, the time and logistics required in the dispensing of a considerable quantity of feed by hand in a short period of time frequently results in inadequate feeding of the chicks and many small chicks die as a result of this unintentional neglect. Conventional auger-operated mechanical feeders are not designed to feed these small chicks.

Accordingly, it is an object of this invention to provide a new and improved brooder chick feeding apparatus which is located in the brooder area of a chicken or poultry house, which apparatus includes a feed distribution system of the auger-tube or trough design which is suspended at various points along the length of the brooder area, in order to better facilitate distribution of feed to the chicks in the brooder area and elevation of the feed distribution system from the brooder area floor to facilitate variation in feed rate as well as cleaning and other maintenance operations.

Another object of this invention is to provide a new and improved brooder feeding apparatus for poultry houses, which brooder feeding apparatus is characterized by an elongated tube or trough provided with an internal flex auger and a feed hopper at one end with an automatic cut-off switch at the opposite end, the tube or trough further provided with openings spaced at drop tubes located in spaced relationship along the length thereof, for sequentially receiving feed and depositing the feed in shallow feed pans located beneath the drop tubes and further including support cables attached to the feed distribution apparatus for raising and lowering the apparatus, as desired.

Still another object of this invention is to provide a new and improved brooder feeding apparatus for poultry houses, which brooder feeding apparatus is designed specifically to locate in the brooder area of a poultry house and is characterized by an elongated primary tube or trough fitted with support cables and means such as a winch for raising and lowering the primary tube or trough to a selected height above ground level by operation of the winch, the primary tube or trough further provided with drop tubes located in spaced relationship thereon and openings provided in the tube or trough corresponding to the drop tubes, with a feed hopper located at one end of the tube or trough and a cut-off switch at the opposite end, the tube or trough also fitted with a flex auger driven by a motor for moving feed from the feed hopper down the entire length of the tube or trough for distribution through the drop tubes and into shallow feed pans located beneath the drop tubes to feed baby chicks in the brooder area only.

A still further object of this invention is to provide a new and improved brooder feeding apparatus which includes an elongated pipe, tube or trough provided with a flex auger therein and a feed hopper at one end for receiving one end of the flex auger, with a control box located at the opposite end and a motor provided in close proximity to the control box for driving the flex auger and further including multiple drop tubes extending from the tube or trough and holes in the tube or trough at the drop tubes for despensing feed through the drop tubes into shallow feed pans located beneath the tubes.

SUMMARY OF THE INVENTION

These and other objects of the invention are provided in a brooder feeding apparatus for location in the brooder area of a chicken or poultry house, which brooder feeding apparatus is characterized by an elongated tube or trough suspended by cables from the frame or rafters of the poultry house, with winch means connected to the cables for raising and lowering the tube or trough, and further including multiple drop tubes provided in spaced relationship along the length of the tube or trough, for receiving feed from a hopper located on one end of the tube or trough, the feed moved sequentially to the drop tubes by means of an auger rotatably fitted inside the tube or trough and the tube or trough terminated at the opposite end by a control tube fitted with a microswitch and timing means for terminating rotation of the auger when a specified quantity of feed has been distributed and reactivating the auger after a predetermined period of time has elapsed.

BRIEF DESCRIPTION OF THE DRAWING

The invention will be better understood by reference to the accompanying drawings, wherein:

FIG. 1 is a perspective view, partially in section, of a first preferred brooder feeding apparatus of this invention utilizing a feed tube;

FIG. 2 is a sectional view illustrating an alternative feed trough with a preferred drop tube and auger configuration in a second preferred brooder feeding apparatus.

FIG. 3 is a sectional view, taken along line 3—3 in FIG. 1, more particularly illustrating a preferred feed hopper design;

FIG. 4 is a sectional view, taken along line 4—4 in FIG. 1, more particularly illustrating a typical feed tube, drop tube and auger configuration in the first preferred brooder feeding apparatus;

FIG. 5 is a sectional view, taken along 5—5 in FIG. 1, of a preferred control box for controlling the supply of feed distributed by the brooder feeding apparatus;

FIG. 6 is a top elevation of a preferred poultry house layout illustrating a preferred brooder area in the center thereof and twin brooder feeding apparatus located in the brooder section thereof; and FIG. 7 is a side view of a brooder feeding apparatus of alternative design utilizing relocation of the drive motor.

DESCRIPTION OF THE PREFERRED EMBODIMENTS

Referring initially to FIGS. 1 and 6 of the drawings, in a first preferred embodiment the brooder feeding apparatus of this invention is generally illustrated by reference numeral 1. As illustrated in FIG. 6, the brooder feeding apparatus 1 is located in the centralized brooder area 2 of a poultry house 3 having sides 4, a front panel 5, a rear panel 6 and a ground level illustrated by reference numeral 7. While the brooder area 2 is illustrated in the central area of the entire poultry house 3, it will be appreciated that the brooder area 2 can also be designed to extend only in the central area of one-half, one-third, or other selected area in the poultry house 3. As illustrated in FIG. 1, in a most preferred embodiment of the invention the brooder feeding apparatus 1 is suspended from a rafter 8 in the poultry house 3 by means of support cables 23, wound around support pulleys 24, which are carried by rafter hooks 25 embedded in or attached to the rafter 8. As further illustrated in FIG. 6, multiple brooders 9 are provided in spaced relationship on the ground level 7 of the poultry house 3 and a pair of the brooder feeding apparatus 1 span the brooders 9 in space, parallel relationship, elevated from the ground level 7. Conventional feeders 52 are located along the sides 4 of the poultry house 3 and serve to dispense feed into the taller conventional pans 53, to feed larger chickens or other poultry located outside the brooder area 2.

Referring now to FIGS. 1 and 2 of the drawings in a second preferred embodiment of the invention, the feed tube 27 in the brooder feeding apparatus 1 is replaced by a rounded feed trough 38, provided with upwardly-extending trough flanges 39 and an auger 31 extending through the feed trough 38 as illustrated in FIG. 2. Cylindrically-shaped drop tubes 34, provided with curved extensions 39a terminate at tube flanges 40, which are located in alignment with the trough flanges 39. The drop tubes 34 extend downwardly from the feed trough 38 in spaced relationship to terminate above the shallow brooder feed pans 42. A pin extends through registering openings (not illustrated) provided in companion trough flanges 39 and tube flanges 40, to facilitate suspension of the feed trough 38, interior auger 31 and the drop tubes 34 by means of the support cables 23.

Referring now to FIGS. 1 and 3–5 of the drawings in the first preferred embodiment of the invention the brooder feeding apparatus 1 is characterized by a cylindrically-shaped feed tube 27, having a tube bore 28 and fitted with support hooks 29 is spaced relationship along the length thereof. Multiple cable hooks 30 are provided on one end of the support cables 23 for engaging the support hooks 29 and elevating the feed tube 27 from the ground level 7, as illustrated in FIG. 4. The auger 31 is positioned in longitudinal orientation inside the tube bore 28 and one end of the auger 31 terminates in the hopper trough 11 of the feed hopper 10, as illustrated in FIG. 3, while the opposite end terminates in the control box 43, as illustrated in FIG. 5. In a most preferred embodiment of the invention the auger 31 is a conventional auger such as the commonly used "flex" auger, having a continuous auger flute 32 would around a central auger shaft 18. One end of the auger shaft 18 extends through a bearing 33, seated in one of the trough ends 12 of the hopper trough 11 and terminates in a hopper pulley 17. The opposite end of the auger shaft 18 terminates in another bearing 33, which is seated in one of the box sides 45 of the control box 43.

In another preferred embodiment of the invention the control box 43 includes a box top 44, to which are connected four box hooks 48 for suspending the control box 43 from a harness 22 and one of the support cables 23. The box sides 45 support the box top 44 and a box bottom 46, provided with a bottom opening 47, completes the control box 43. A microswitch 49 is mounted to one of the box sides 45 and a switch lever 50 projects downwardly from the microswitch 49 beneath the tube opening 36 in the tube wall 37 of the feed tube 27. The auger 31 is driven by a belt 26, which engages the hopper pulley 17 and also engages the motor pulley 15 mounted on the motor shaft 16 of a motor 14, as illustrated in FIGS. 1 and 3. In yet another preferred embodiment of the invention the motor 14 is secured to one of the trough sides 13 of the hopper trough 11 by means of a motor bracket 19. In another preferred embodiment those support cables 23 which are located above the feed hopper 10 are connected to a harness 22, which is in turn secured to the trough sides 13 of the hopper trough 11, in order to support the feed hopper 10 from the rafter 8, as illustrated in FIG. 1. As illustrated in FIG. 4 the opening 36 which is provided in the feed tube 27 at each drop tube 34, is sized to facilitate rapid distribution of feed 35 from the tube bore 28 of the feed tube 27 through the drop tubes 34 and into the brooder feed pans 42, as hereinafter described.

Referring now to FIGS. 1–5 of the drawings when it is desired to fill the respective brooder feed pans 42 with feed 35 located in the hopper trough 11 of the feed hopper 10, the motor 14 is initially energized by appropriate switch means (not illustrated). Activation of the motor 14 causes the motor pulley 15 and the hopper pulley 17 to rotate, thereby rotating the auger 31. Feed 35 located in the hopper trough 11 is caused to move along the length of the feed tube 27 illustrated in FIGS. 1, 3 and 5 or the feed trough 38, as illustrated in FIG. 2, depending upon the chosen design of the brooder feeding apparatus 1, and initially drops through the first of the tube openings 36 in the drop tubes 34 located closest to the feed hopper 10. As the feed 35 spills from the first one of the drop tubes 34 and begins to stack in a pyramid configuration in the corresponding brooder feed pan 42, the end of this drop tube 34 is covered with feed 35, thereby plugging the drop tube 34. Additional feed 35 then moves on through the feed tube 27 or feed trough 38 and begins to sequentially spill through the remaining drop tubes 34. When the feed 35 stacks past the ends of the first series of drop tubes 34 and fills these drop tubes 34, the feed stops pouring through the corresponding tube openings 36 in the feed tube 27 or the feed trough 38, respectively, and is pushed on to the next succeeding one of the drop tubes 34. As the respective drop tubes 34 are each blocked by the rising level of the feed 35 in the respective brooder feed pans 42, the next successive one of the drop tubes 34 receives the majority of the feed passing through the feed tube 27 or feed trough 38. In this manner, each of the brooder feed pans 42 are filled, beginning with the brooder feed pan 42 which is closest to the feed hopper 10 and when the last tube opening 36, located inside the control box 43 is reached by the feed 35, the feed 35 contacts the switch lever 50 and closes the microswitch 49. This action terminates operation of the motor 14 by the electrical connection between the microswitch 49, due to the motor wiring 51.

Referring again to FIG. 1 of the drawing in another most preferred embodiment a timer 20 is attached to the hopper trough 11 by means of a timer bracket 21 and is wired to the motor 14 by means of timer wiring 54, in order to facilitate operation of the motor 14 for for a preselected period of time. Accordingly, when there are a large number of chicks or other small poultry in the brooder area 2 than is normally the case, the brooder feeding apparatus 1 is allowed to run by operation of the timer 20 for a longer period of time than the twice daily cycle which ordinarily would be provided, in order to feed these chicks. Since the microswitch 49 terminates operation of the motor 14 and the auger 31 when the brooder feed pans 42 are full of feed 35 regardless of the timing cycle, the technique of "limit feeding" is implemented. The timer 20 is normally set to operate the feed cycle for about 15 minutes and operates every four hours when a large number of chicks are to be fed. It will be further appreciated by those skilled in the art that raising or lowering of the feed tube 27 or the feed trough 38, depending upon which apparatus is used, will vary the amount of feed 35 which is deposited in each of the brooder pans 42, since the height of the pyramid of feed 35 must be greater at higher elevations of the feed tube 27 or feed trough 38, in order to block the respective drop tubes 34. Accordingly, the amount of feed 35 which is deposited in the respective brooder pans 42 can also be controlled by controlling the height of either the feed tube 27 or the feed trough 38 with respect to the ground level 7 and the brooder pans 42. In a typical installation the brooder feeding apparatus 1 is adjusted to a height such that the feed tube 27 in the control box 43 is about one-half of an inch farther from the companion brooder feed pan 42 than the feed tube 27 located nearest the feed hopper 10. Furthermore, the entire brooder feeding apparatus 1 can be raised to a selected height with respect to the ground level 7 in order to facilitate cleaning of the brooder area 2, or for other maintenance purposes which may become necessary.

Referring now to FIG. 7 of the drawing in a third preferred embodiment of the invention, the motor 14 is located adjacent to or mounted on the control box 43 of a reverse feed brooder feeding apparatus 55, while the feed hopper 10 is located on the opposite end of the feed tube 27, as illustrated. Under these circumstances, the auger 31 is caused to rotate in the same direction as that rotation illustrated in FIGS. 3–5, in order to facilitate pulling the feed 35 in the direction of the arrow inside the feed tube 27 or the feed trough 38 from the hopper trough 11 to the control box 43, by operation of the relocated motor 14. As in the case of the brooder feeding apparatus 1 illustrated in FIGS. 1–6, the reverse feed brooder feeding apparatus 55 can be adjusted in height with respect to the ground level 7 for controlling the flow of the feed 35, as heretofore described.

While the preferred embodiments of the invention have been described above it will be recognized and understood that various modifications may be made therein and the appended claims are intended to cover all such modifications which may fall within the spirit and scope of the invention.

Having described my invention with the particularity set forth above, what is claimed is:

1. A brooder feeding apparatus for poultry house comprising a rounded feed trough extending through the brooder area of the poultry house; spaced trough flanges provided at the top edges of said feed trough; a feed hopper located at one end of said feed trough for supplying feed to said feed trough; switch means located at the opposite end of said feed trough for terminating the flow of feed from said feed hopper through said feed trough; an auger disposed for rotation inside said feed trough and said feed hopper and a motor provided in electrical connection with said switch means and in mechanical connection with said auger for rotating said auger inside said feed trough and said feed hopper and transferring feed from said feed hopper through said feed trough to said switch means; a plurality of drop tubes extending downwardly from said feed trough in spaced relationship, said drop tubes communicating with the interior of said feed trough; and curved extensions provided on said drop tubes, said curved extensions engaging said feed trough; tube flanges shaped in the ends of said curved extensions, said tube flanges positioned adjacent said trough flanges in said feed trough; a plurality of pins extending through each companion set of said trough flanges and said tube flanges, respectively; and wire cables attached to said pins and the poultry house, with winch means provided in cooperation with said wire cables for adjusting the height of said feed trough and said drop tubes above ground level, whereby the feed is caused to flow through said feed trough and sequentially through said drop tubes to ground level responsive to rotation of said auger.

2. The brooder feeding apparatus of claim 1 further comprising a shallow brooder feed pan having a short containing rim provided beneath each of said drop tubes for containing the feed.

3. The brooder feeding apparatus of claim 1 further comprising timing means provided in cooperation with said motor and said switch means for selectively determining the time of operation of said motor and rotation of said auger.

4. The brooder feeding apparatus of claim 1 wherein said switch means further comprises a control box adapted to receive said opposite end of said feed tube, a microswitch mounted inside said control box and a switch lever carried by said microswitch, whereby said microswitch is activated to stop said motor when feed accumulates on said switch level.

5. A brooder feeding apparatus for providing feed to brooder chicks in the brooder area of a poultry house, comprising:
 (a) an elongated, rounded feed trough provided with space trough flanges along at least a portion of the length of said feed trough and tube openings provided in the bottom of said feed trough in spaced relationship;
 (b) an auger disposed for rotation in said feed trough and a motor provided in connection with said auger for rotating said auger inside said feed trough;
 (c) a feed hopper located at one end of said feed trough, said feed hopper receiving one end of said auger for moving feed from said feed hopper through said feed trough responsive to operation of said motor;
 (d) a plurality of shallow brooder feed pans each having a short containing rim provided beneath said feed trough in spaced relationship;
 (e) a plurality of drop tubes extending downwardly from said feed trough at said tube openings, respectively, for depositing feed from said feed hopper and said feed trough into said brooder feed pans, respectively, responsive to rotation of said auger; curved extensions provided on said drop tubes, said curved extensions engaging said feed trough; tube flanges shaped in the ends of said curved extensions, said tube flanges positioned adjacent said trough flanges in said feed trough and a pin extending through each companion set of trough flanges and said tube flanges, respectively;
 (f) switch means carried by the opposite end of said feed trough for terminating the flow of feed through said feed trough; and
 (g) suspension means extending from said poultry house to said feed trough in spaced relationship for supporting said feed trough and said drop tubes at a selected distance from said brooder feed pans.

6. The brooder feeding apparatus of claim 5 wherein said switch means further comprises a control box adapted to receive said opposite end of said feed tube, a microswitch mounted inside said control box and a switch lever carried by said microswitch, whereby said microswitch is activated to stop said motor when the feed accumulates on said switch lever.

7. The brooder feeding apparatus of claim 6 wherein said suspension means further comprises wire cables attached to said pins and the poultry house, with winch means provided in cooperation with said wire cables for adjusting the height of said feed trough and said drop tubes above said brooder feed pans.

8. The brooder feeding apparatus of claim 7 further comprising timing means provided in cooperation with said motor and said switch means for selectively determining the time of operation of said motor and rotation of said auger.

9. A brooder feeding apparatus for installation in the brooder area of a poultry house comprising:
 (a) an elongated feed conveying member extending through the brooder area of the poultry house;
 (b) a plurality of cables suspending said feed conveying member above ground level in the poultry house and a winch provided in cooperation with said cables for adjusting the height of said feed conveying member;
 (c) a feed hopper located at one end of said feed conveying member and switch means located at the opposite end of said feed conveying member for terminating the flow of feed from said feed hopper through said feed conveying member to said switch means;

(d) an auger disposed for rotation inside said feed conveying member and a motor provided in association with said switch means and said auger for rotating said auger inside said feed conveying member and transferring feed from said feed hopper to said switch means; and (e) a plurality of drop tubes extending downwardly from said feed conveying member in spaced relationship, said drop tubes communicating with the interior of said feed conveying member and a plurality of shallow brooder feed pans, each having a short containing rim provided beneath said drop tubes, respectively, said feed pans disconnected from said drop tubes, for containing the feed, whereby the feed is caused to flow sequentially through said drop tubes to said brooder feed pans responsive to operation of said auger and the volume of the feed is proportional to the height of said drop tubes above said feed pans.

10. The brooder feeding apparatus of claim 9 wherein said feed conveying member further comprising a feed tube provided with tube openings at each of said drop tubes to facilitate the flow of feed from said feed tube through said drop tubes, said flow of feed beginning with said drop tubes located closest to said feed hopper.

11. The brooder feeding apparatus of claim 9 wherein said feed conveying member further comprises a rounded feed trough provided with spaced trough flanges at the top edges thereof and further provided with tube openings at each of said drop tubes to facilitate the flow of feed from said feed tube through said drop tubes, said flow of feed beginning with said drop tubes located closest to said feed hopper.

12. The brooder feeding apparatus of claim 11 further comprising curved extensions provided on said drop tubes, said curved extensions engaging said feed trough; tube flanges shaped in the ends of said curved extensions, said tube flanges positioned adjacent said trough flanges in said feed trough; a plurality of pins extending through each companion set of said trough flanges and said tube flanges, respectively; and wire cables attached to said pins and the poultry house, with winch means provided in cooperation with said wire cables for adjusting the height of said feed trough and said drop tubes above ground level.

* * * * *